US 11,442,717 B2

(12) United States Patent
Chertov et al.

(10) Patent No.: US 11,442,717 B2
(45) Date of Patent: Sep. 13, 2022

(54) SYSTEM AND METHOD FOR UPDATING STATE INFORMATION

(71) Applicant: Arista Networks, Inc., Santa Clara, CA (US)

(72) Inventors: Roman Olegovich Chertov, San Jose, CA (US); Adam James Sweeney, Santa Clara, CA (US); Hugh W. Holbrook, Palo Alto, CA (US); Karthik Shyam Krishnan Subraveti, Fremont, CA (US)

(73) Assignee: Arista Networks, Inc., Santa Clara, CA (US)

( * ) Notice: Subject to any disclaimer, the term of this patent is extended or adjusted under 35 U.S.C. 154(b) by 192 days.

(21) Appl. No.: 16/835,751

(22) Filed: Mar. 31, 2020

(65) Prior Publication Data

US 2021/0303288 A1 Sep. 30, 2021

(51) Int. Cl.
*G06F 8/65* (2018.01)
*H04L 12/18* (2006.01)

(52) U.S. Cl.
CPC .............. *G06F 8/65* (2013.01); *H04L 12/18* (2013.01)

(58) Field of Classification Search
CPC .................................. G06F 8/65; H04L 12/18
See application file for complete search history.

(56) References Cited

U.S. PATENT DOCUMENTS

| | | | |
|---|---|---|---|
| 6,065,039 A | 5/2000 | Paciorek | |
| 7,096,464 B1* | 8/2006 | Weinmann | G06F 8/65 717/172 |
| 7,275,081 B1* | 9/2007 | Katz | G06F 16/90344 707/999.1 |
| 7,987,449 B1* | 7/2011 | Marolia | G06F 8/658 717/121 |
| 9,489,190 B1* | 11/2016 | Wang | G06F 8/65 |
| 9,571,656 B2 | 2/2017 | Barinov | |
| 10,769,233 B2* | 9/2020 | Vaidya | G06F 8/65 |
| 2003/0217096 A1 | 11/2003 | McKelvie et al. | |
| 2006/0048130 A1* | 3/2006 | Napier | G06F 8/65 717/168 |
| 2007/0266075 A1 | 11/2007 | Jachner | |

(Continued)

OTHER PUBLICATIONS

Bhambay et al., "Differential Encoding for Real-Time Status Updates", 2017, IEEE (Year: 2017).*

(Continued)

*Primary Examiner* — Wei Y Zhen
*Assistant Examiner* — Junchun Wu
(74) *Attorney, Agent, or Firm* — Chamberlain, Hrdlicka, White, Williams & Aughtry

(57) ABSTRACT

A network device includes a first agent programmed to provide a functionality of the network device. The network device also includes a message bus, distinct from the first agent, that identifies an update associated with the first agent, the update includes differential state information based, at least in part, on a state of the first agent, the state of the first agent is stored in a data structure exclusively managed by the first agent; in response to identifying the update: identifies a second agent that is subscribed to the first agent; and performs an action set to provide the second agent with access to the update.

17 Claims, 10 Drawing Sheets

(56) References Cited

U.S. PATENT DOCUMENTS

| | | | |
|---|---|---|---|
| 2008/0301660 A1* | 12/2008 | Rao | G06F 8/65 717/170 |
| 2010/0293538 A1* | 11/2010 | Wolf | G06F 8/65 717/170 |
| 2012/0198432 A1* | 8/2012 | Arakawa | G06F 8/65 717/169 |
| 2013/0139139 A1* | 5/2013 | Mallur | G06F 8/65 717/170 |
| 2013/0219381 A1* | 8/2013 | Lovitt | G06F 8/65 717/173 |
| 2013/0263107 A1* | 10/2013 | Hamakawa | G06F 8/65 717/168 |
| 2014/0024368 A1* | 1/2014 | Jin | H04W 60/00 455/433 |
| 2014/0126711 A1 | 5/2014 | Barinov | |
| 2014/0245279 A1* | 8/2014 | Ohtake | G06F 9/445 717/170 |
| 2016/0132214 A1* | 5/2016 | Koushik | G06F 9/455 715/741 |
| 2016/0335074 A1* | 11/2016 | Olivier | H04L 67/10 |
| 2017/0131990 A1* | 5/2017 | Wabe | G06F 1/3265 |
| 2019/0228401 A1* | 7/2019 | Ricket | G07F 15/003 |
| 2019/0370410 A1* | 12/2019 | Kapke | G06F 9/54 |
| 2020/0128107 A1 | 4/2020 | Clark | |
| 2020/0128108 A1 | 4/2020 | Clark et al. | |
| 2020/0364286 A1* | 11/2020 | Vaidya | G06F 8/65 |
| 2021/0303288 A1* | 9/2021 | Chertov | G06F 8/65 |

OTHER PUBLICATIONS

Costa et al., "On the Age of Information in Status Update Systems With Packet Management", Apr. 2016, IEEE, vol. 62, No. 4 (Year: 2016).*

Cornforth et al., "Ordered asynchronous processes in multi-agent systems", Apr. 2005, Elsevier B.V. (Year: 2005).*

Qin et al., "Stationary Consensus of Asynchronous Discrete-Time Second-Order Multi-Agent Systems Under Switching Topology", 2012, IEEE, vol. 8, No. 4 (Year: 2012).*

* cited by examiner

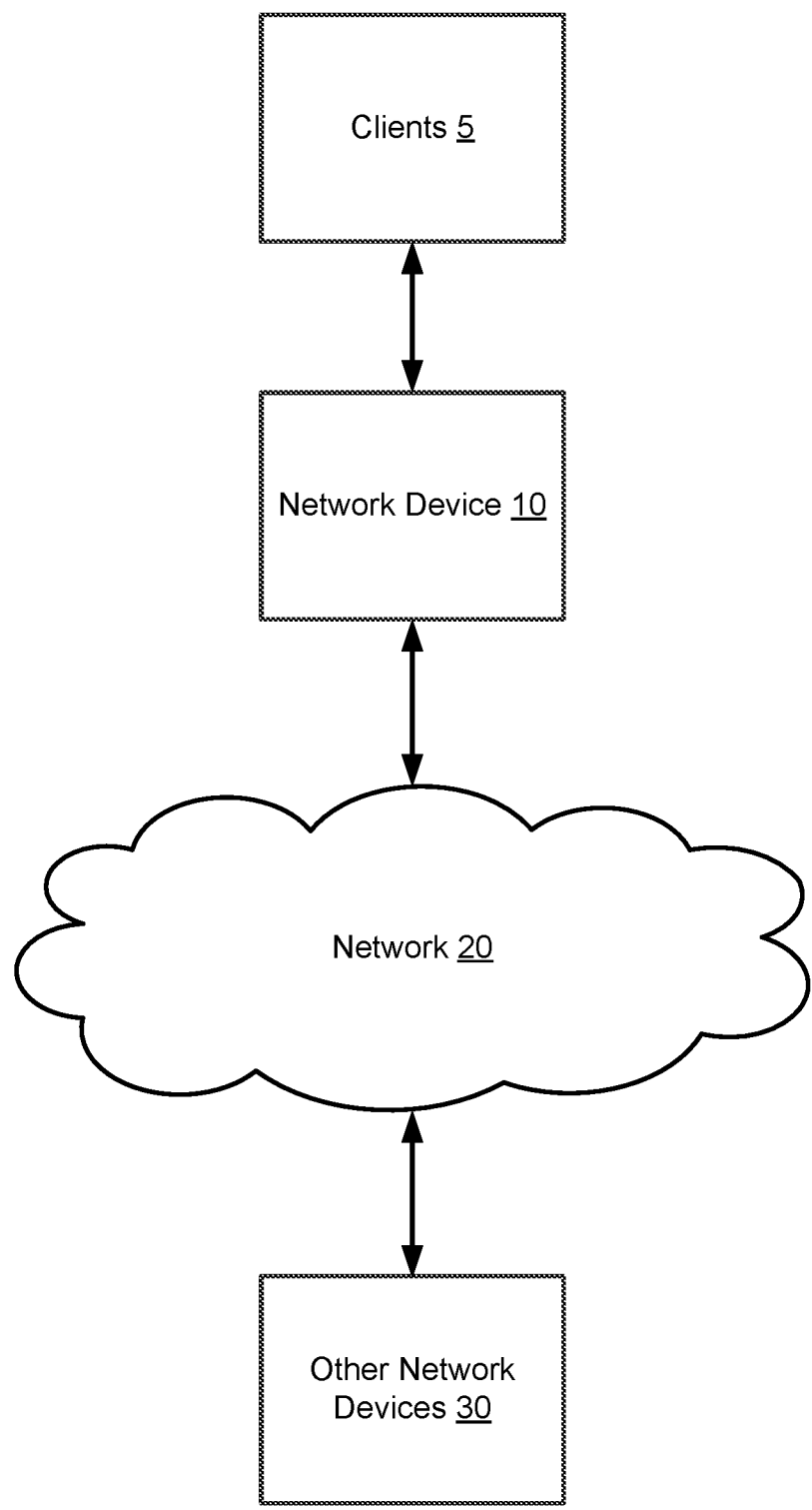
FIG. 1.1

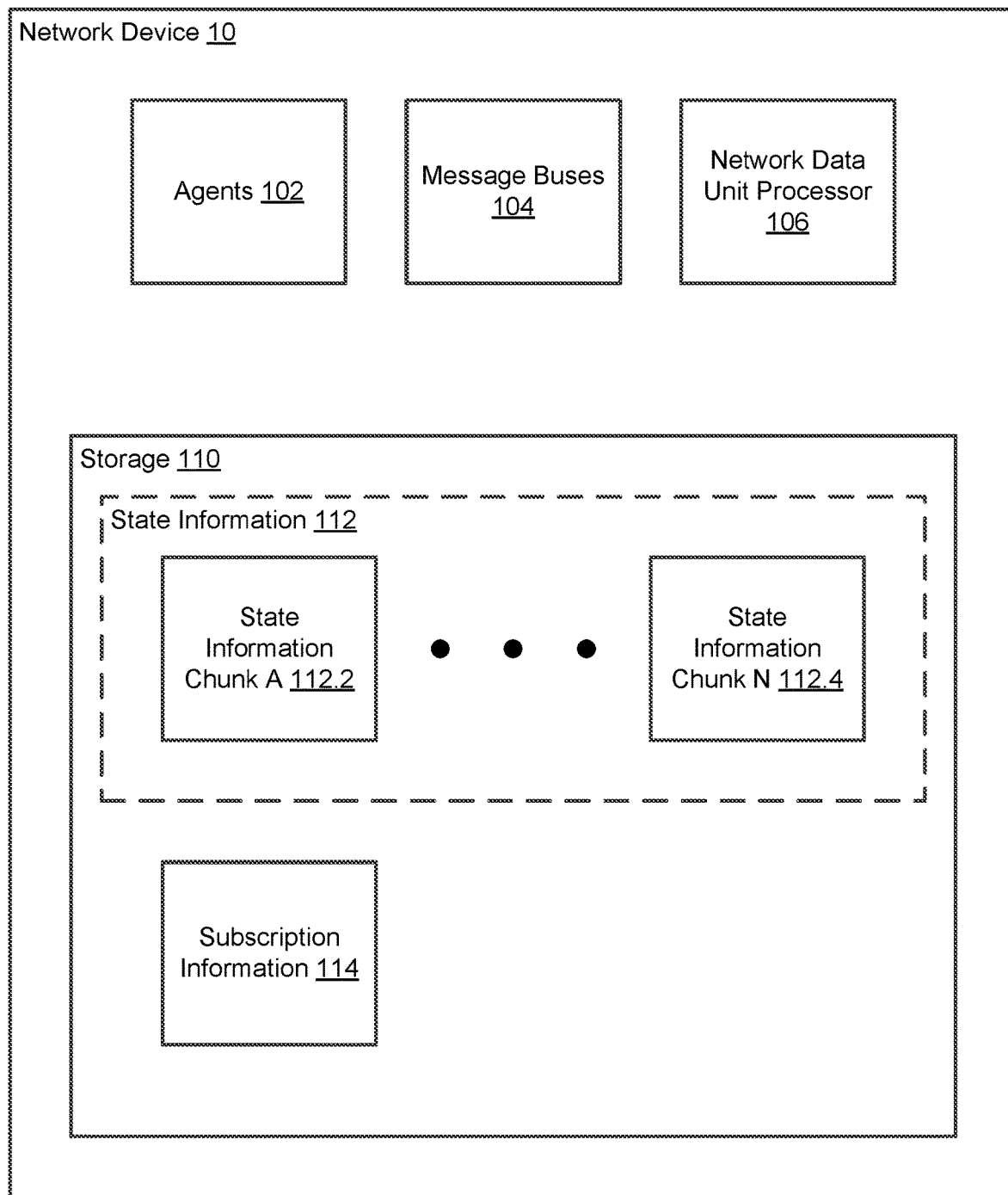
FIG. 1.2

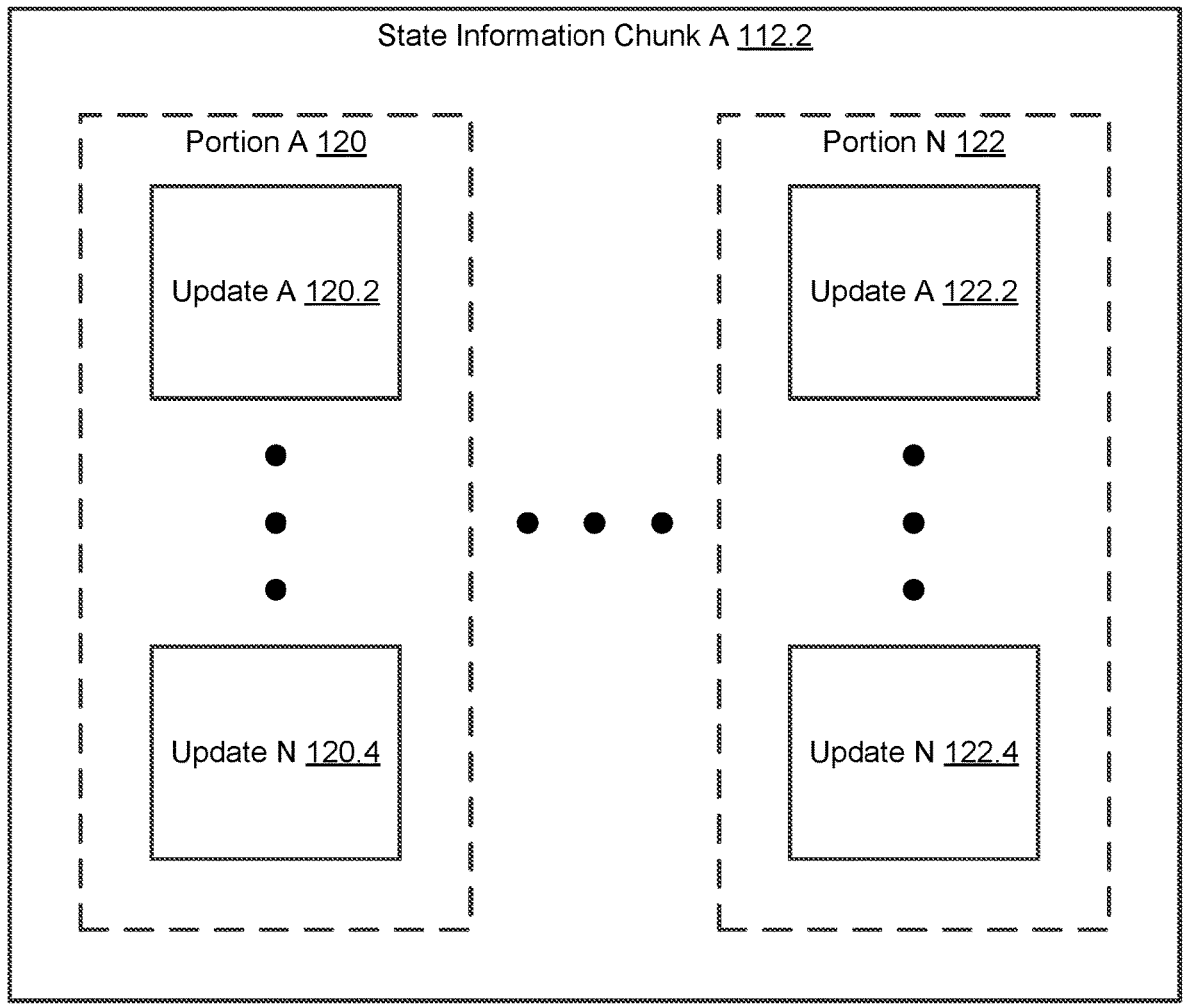
FIG. 1.3

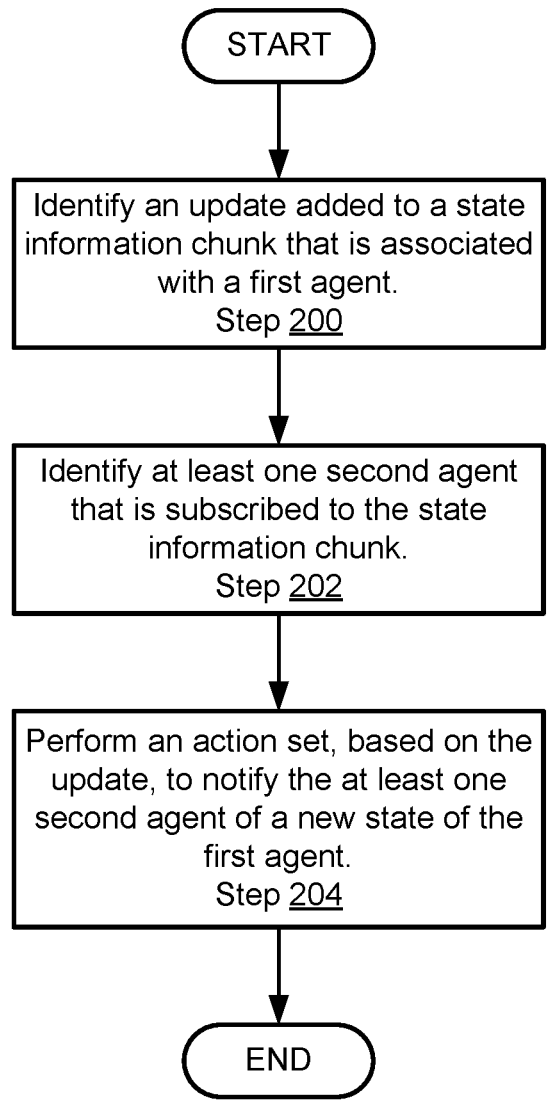
FIG. 2.1

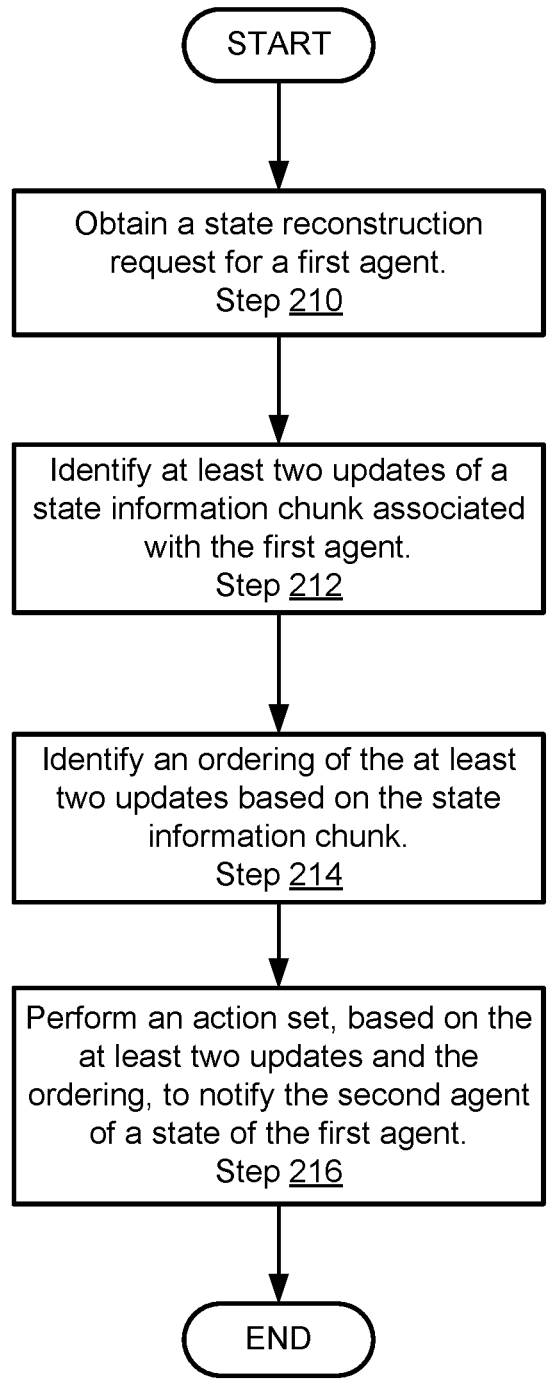
FIG. 2.2

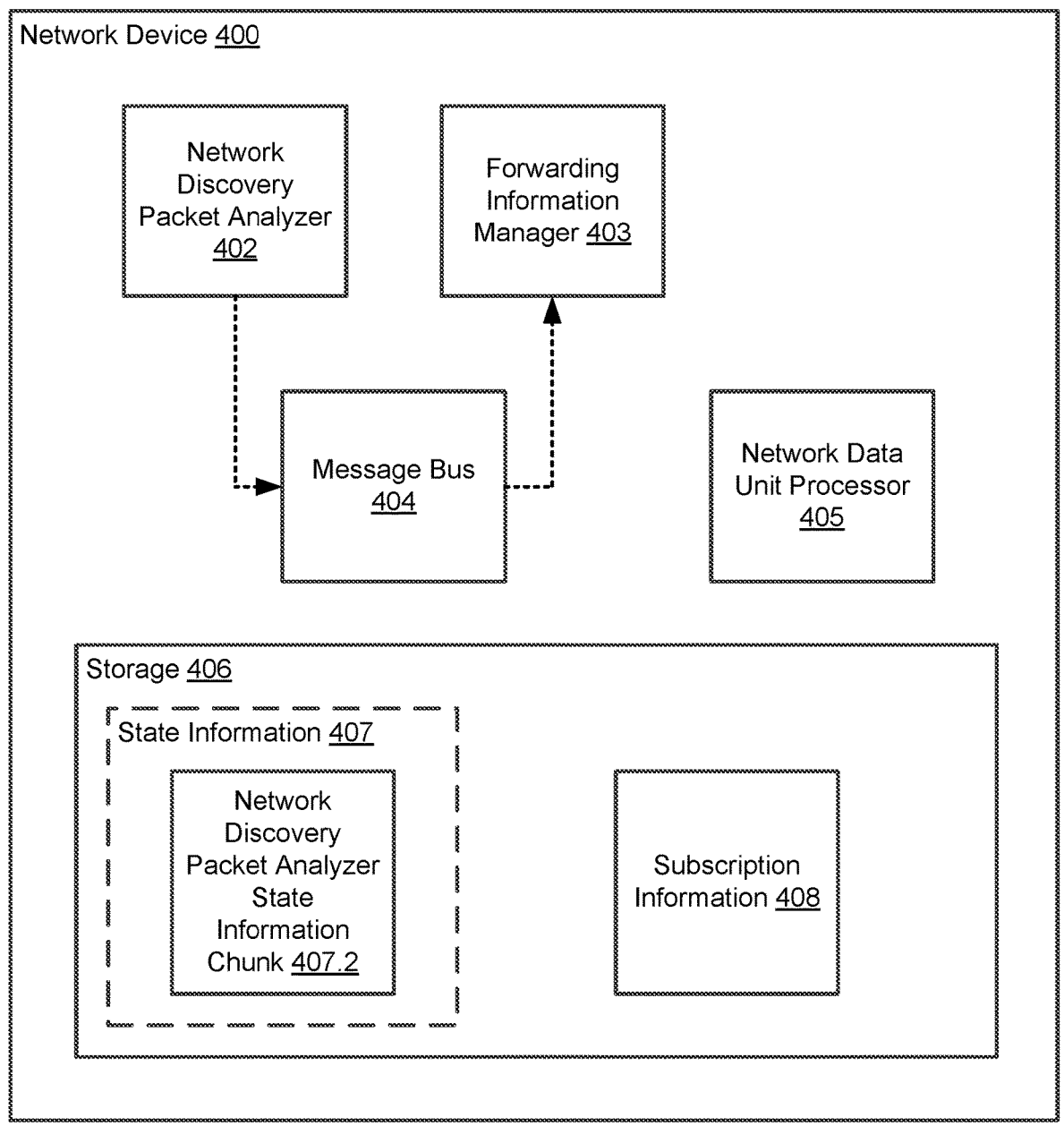
FIG. 4.1

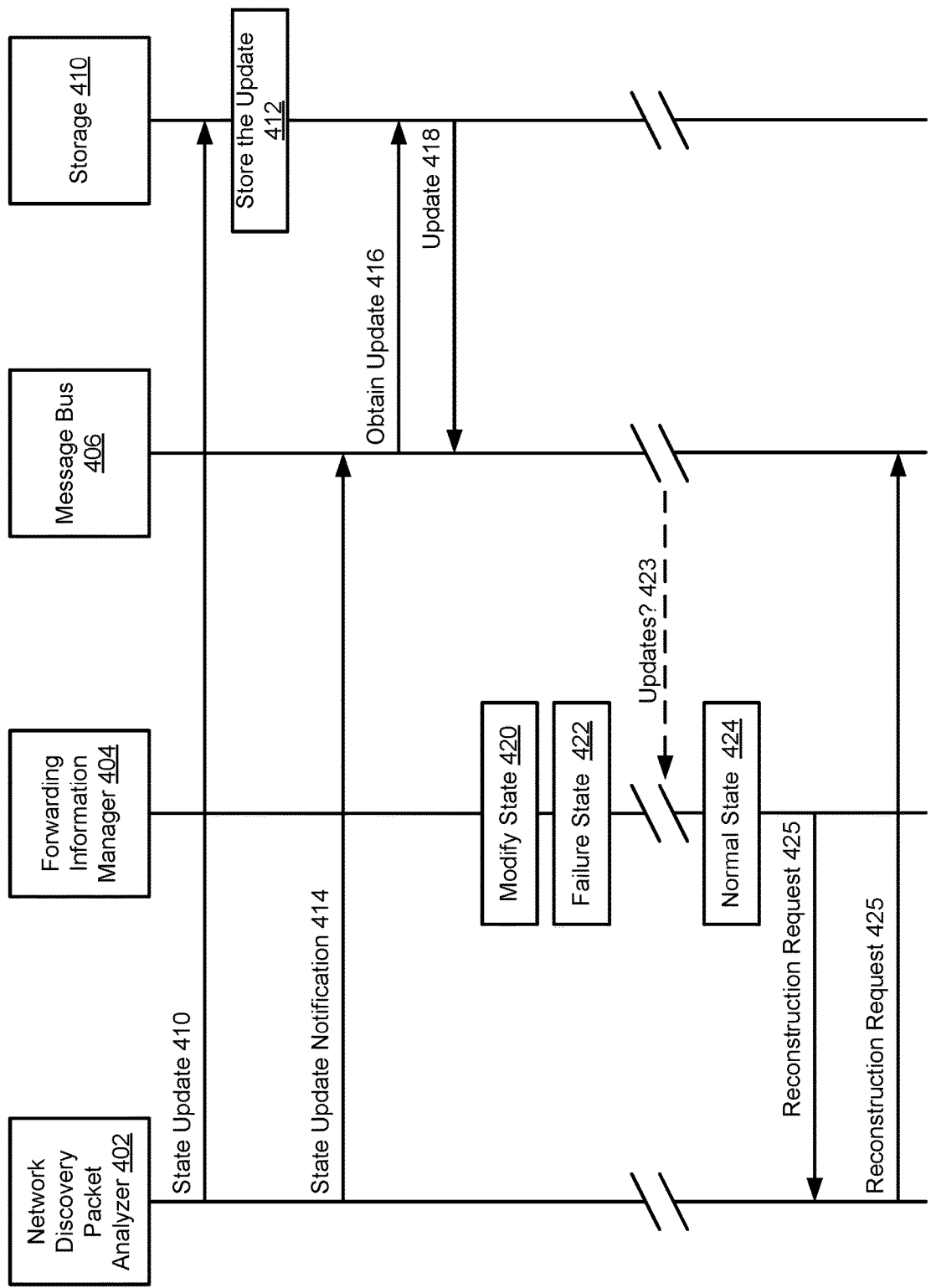
FIG. 4.2

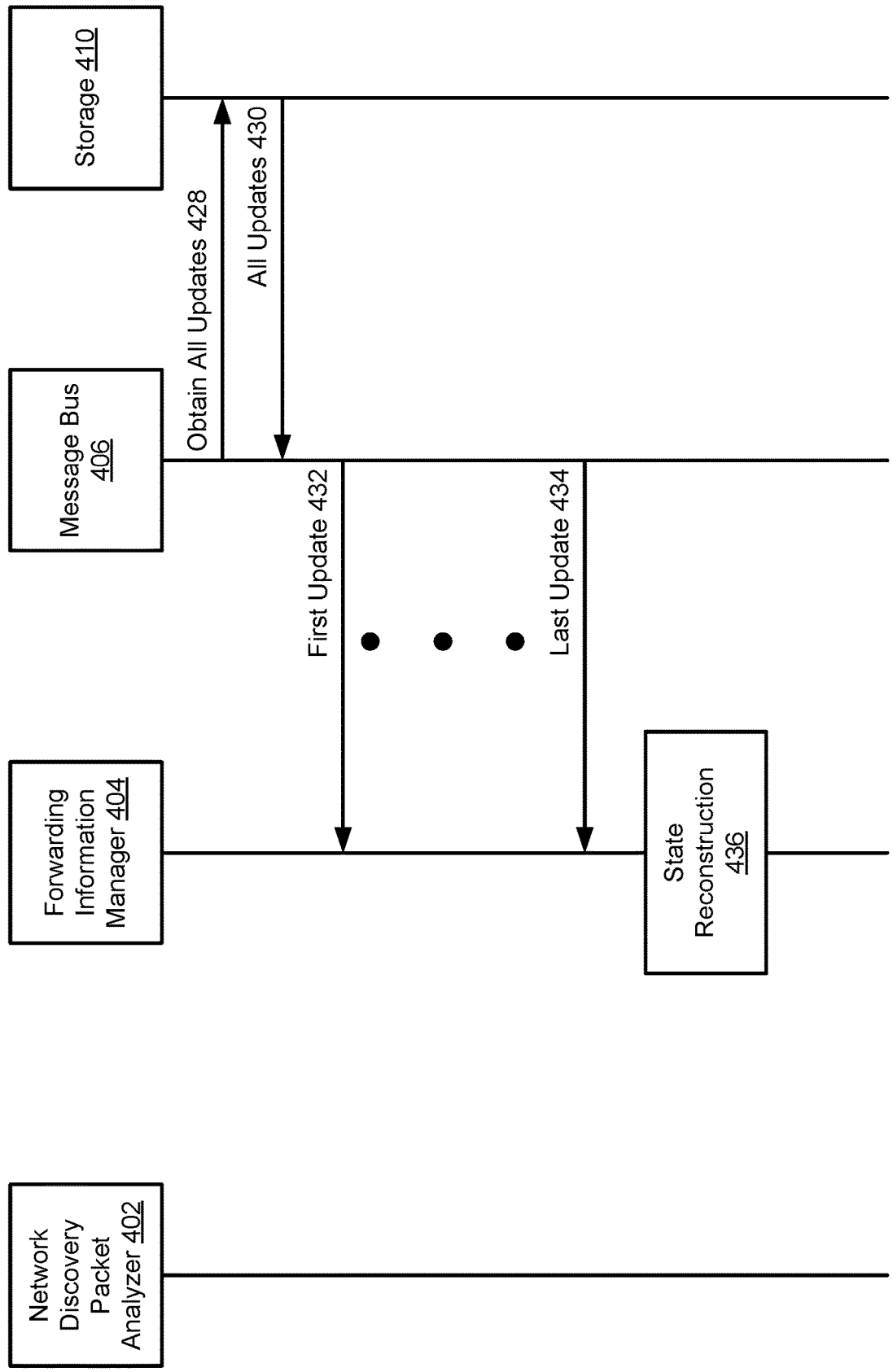
FIG. 4.3

SYSTEM AND METHOD FOR UPDATING STATE INFORMATION

BACKGROUND

Computing devices may host logical entities such as, for example, instances of processes. The behavior of logical entities may change over time. For example, during some periods of time the logical entities may perform actions associated with a first behavior while during other periods of time the logical entities may perform actions associated with a second behavior. The different behaviors of logical entities may be dictated by the corresponding computer code that when executed by a processor gives rise to the logical entities.

SUMMARY

In one aspect, a network device in accordance with one or more embodiments disclosed herein includes a first agent programmed to provide a functionality of the network device. The network device also includes a message bus, distinct from the first agent, that identifies an update associated with the first agent, the update includes differential state information based, at least in part, on a state of the first agent, the state of the first agent is stored in a data structure exclusively managed by the first agent; in response to identifying the update: identifies a second agent that is subscribed to the first agent; and performs an action set to provide the second agent with access to the update.

In one aspect, a method in accordance with one or more embodiments disclosed herein includes identifying, by a message bus, an update associated with a first agent, distinct from the message bus, that provides a functionality of a network device, the update includes differential state information based, at least in part, on a state of the first agent, the state of the first agent is stored in a data structure exclusively managed by the first agent; in response to identifying the update, by the message bus: identifying a second agent that is subscribed to the first agent; and performing an action set to provide the second agent with access to the update.

In one aspect, a non-transitory computer readable medium in accordance with one or more embodiments disclosed herein includes computer readable program code, which when executed by a computer processor enables the computer processor to perform a method. The method includes identifying, by a message bus, an update associated with a first agent that provides a functionality of a network device, the update includes differential state information based, at least in part, on a state of the first agent, the state of the first agent is stored in a data structure exclusively managed by the first agent; in response to identifying the update, by the message bus: identifying a second agent that is subscribed to the first agent; and performing an action set to provide the second agent with access to the update.

BRIEF DESCRIPTION OF DRAWINGS

Certain embodiments disclosed herein will be described with reference to the accompanying drawings. However, the accompanying drawings illustrate only certain aspects or implementations of the embodiments disclosed herein by way of example and are not meant to limit the scope of the claims.

FIG. 1.1 shows a diagram of a system in accordance with one or more embodiments disclosed herein.

FIG. 1.2 shows a logical diagram of a network device in accordance with one or more embodiments disclosed herein.

FIG. 1.3 shows a diagram of a state information chunk in accordance with one or more embodiments disclosed herein.

FIG. 2.1 shows a flowchart of a method of distributing state information in accordance with one or more embodiments disclosed herein.

FIG. 2.2 shows a flowchart of method of servicing a restoration request in accordance with one or more embodiments disclosed herein.

FIG. 4.1 shows a non-limiting example of a system.

FIG. 4.2 shows a diagram of interactions and actions performed by components of the system of FIG. 4.1 over time.

FIG. 4.3 shows a continuation of the diagram of FIG. 4.2.

DETAILED DESCRIPTION

Figure 3:
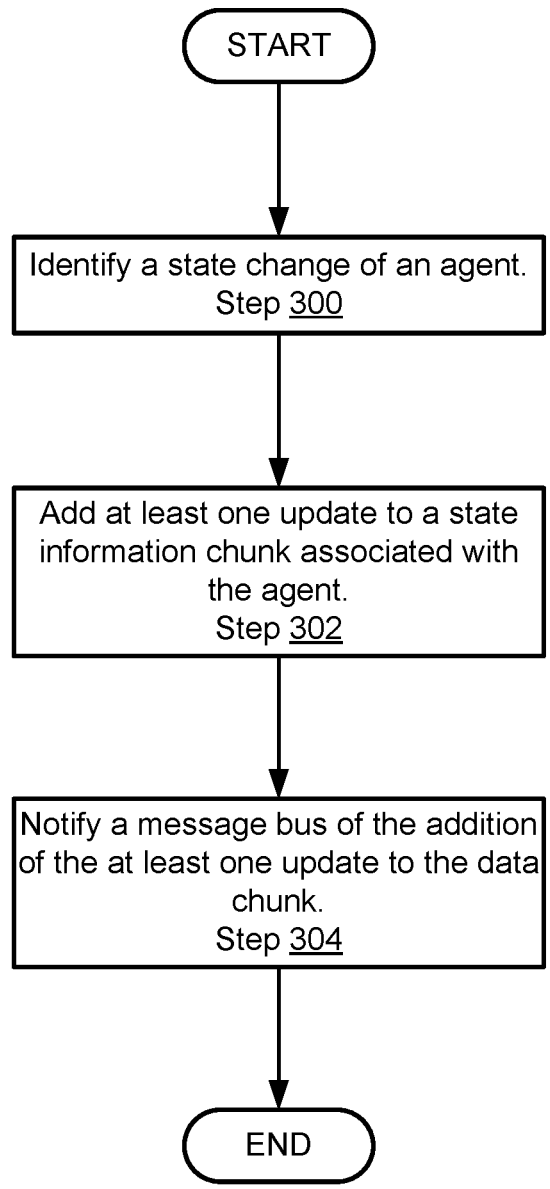
FIG. 3 shows a flowchart of a method of managing state information in accordance with one or more embodiments disclosed herein.

In systems that utilize computing devices, the computing devices may host any number of applications (e.g., may be referred to as agents). The applications hosted by the computers may perform any number of functionalities. For example, the applications may obtain data, process the data to obtain new data, and communicate with other devices.

When applications provide their respective functionalities, the applications may provide their functionalities based on how other applications are providing their functionalities. In other words, the manner in which an application operates may be dependent upon how any number of other applications are operating. The manner in which an application is operating may be referred to as the operating state of the application.

To modify the manner of operation based on the operating state of other entities, the applications (and/or other types of entities) may need to obtain information regarding the states of other entities (e.g., state information). However, if the applications are unable to obtain information regarding the states of other entities, the applications may not be able to operate in a manner based on the operating states of the other entities. Consequently, the operation of the system including the applications may be impaired when the applications are unable to modify their operation based on the state of other entities.

For example, consider a scenario in which a database application operates in a high resource consumption state (e.g., maximize the number of writes to the database) or a low resource consumption state (e.g., reduced write rates) based on the operating state of a second application that stores data in a database managed by the database application. The operating state of the second application may be used by the database application to predict whether large or small amounts of data are likely to need to be stored in the database and modify its operating state accordingly.

However, if the database application is unable to ascertain the operating state of the second application, the database application may be unable to cope with periods of time during which the second application enters a high data generation state and generates large amounts of data, needed to be stored in the database, if the database application continues to operate in a low resource consumption state. In contrast, the database may needlessly consume large amounts of computing resource by operating in the high resource consumption state during periods of time during which the second application operates in a low data generation state and generates small amounts of data that need to be stored in the database.

Additionally, distributing state information may consume computing resources of the computing devices that may be used for other purposes. For example, state information may be stored as a data structure. To distribute the state information, copies of the data structure may need to be provided to the applications that desire access to the state information.

To enable applications (and/or other types of entities) to modify the manner in which their functionalities are provided based on the operating state of other applications (and/or other types of entities), embodiments of the invention may provide a system for distributing state information that (i) is resilient to partial failures of the system that would otherwise prevent large amounts of state information from being distributed and (ii) distribute differential state information that describes changes to the state of an entity rather than information reflect the state of an entity at a point in time. Because differential state information may require fewer computing resources for distribution purposes (when compared to distributing information reflect the state of an entity at a point in time), a system in accordance with embodiments of the invention may marshal the limited computing resources of the system for performing other functions rather than using such resources for state information distribution purposes. Consequently, the system may provide its other functionalities more quickly (e.g., in a higher quality manner).

To distribute state information, the system may utilize a distributed data structure for distributing state information. Different portions of the distributed data structure may be separately managed by separate entities. By doing so, corruption of a portion of the distributed data structure or failure of one of the separate entities may only result in a corresponding portion of the state information for being prevented from being distributed. Consequently, distribution of the majority of the state information may continue even when a partial failure of the system occurs.

In the text that follows, a description of components of a system in accordance with embodiments of the invention is provided with respect to FIGS. 1.1-1.2 followed by a description of a data structure with respect to FIG. 1.3 that may be utilized by the system of FIG. 1.1. After the description of the data structure, a description of methods that may be performed by the system of FIG. 1.1 is provided with respect to FIGS. 2.1-3. An example of a series of actions that may be performed by the system of FIG. 1.1 is provided with respect to FIGS. 4.1-4.3. Lastly, a description of a computing device that may be used to implement the system of FIG. 1.1 is provided with respect to FIG. 5.

Specific embodiments will now be described with reference to the accompanying figures. In the following description, numerous details are set forth as examples. It will be understood by those skilled in the art, and having the benefit of this document, that one or more embodiments described herein may be practiced without these specific details and that numerous variations or modifications may be possible without departing from the scope of the embodiments. Certain details known to those of ordinary skill in the art may be omitted to avoid obscuring the description.

In the following description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, operably connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to methods and systems for distributing state information associated with entities. The entities may include agents. An agent may be a logical entity hosted by a computing device.

The state of the agent may indicate a past, present, and/or future manner of operation of the agent. Different agents may have different states. Over time, the states of agents may change. Accordingly, information regarding the states of agents may similarly change.

Entities (e.g., other agents) may utilize information regarding the states of the agents. For example, a first agent may modify or otherwise change its operation (e.g., its state) based on state information regarding the state of a second agent.

A system in accordance with embodiments described herein may provide a method for distributing state information. The method for distributing state information may be tolerant to partial failures of the system. For example, the method may be implemented in a distributed, independent, and/or asynchronous manner that is able to continue following a partial failure of some of the components of the system. By doing so, state information may continue to be distributed, at least in part, even when one or more portions of the system are in a failure state. By doing so, not all of the entities that utilize state information may be impacted by partial system failures.

FIG. 1.1 shows a diagram of an example system in accordance with one or more embodiments described herein. The system may include clients (5) that utilize services provided by a network device (10). The services provided by the network device (10) may include, for example, network data unit forwarding services. By forwarding network data units, the network device (10) may enable the clients (5) to communicate with other devices (e.g., network 20, other network devices (30)).

For example, the network device (10) may be operably connected to other network devices (30) via a network (20). The network device (10), network (20), and other network devices (30) may cooperate (e.g., all implement one or more common network communication protocols) to forward network data units to each other. The network device (10) may also forward network data units to the clients (5). The network data units may include messages destined for the various devices of the example system. The network data units may be implemented as, for example, packets or other types of network protocol specific data units.

Forwarding network data units may consume computing resources of the devices of FIG. 1.1. For example, when a network data unit is sent from the clients (5) to the network device (10), the network device (10) may need to perform one or more actions to determine to which device (e.g., a device of the network (20) or another device not illustrated in FIG. 1.1) to forward the network data unit.

In addition to forwarding network data units, the network device (10) may also perform other functions. For example, the network device (10) may update its network data unit forwarding functionality based on information obtained from a variety of sources. To update its network data unit forwarding functionality, the network device (10) may perform actions (e.g., processing information regarding a structure of the topology of the example system) to maintain information (e.g., forwarding information) that the network device (10) uses to decide to which devices to forward network data units.

To provide the aforementioned services, any of the devices illustrated in FIG. 1.1 may host agents. Agents may be logical entities that provide all, or a portion, of the aforementioned and/or other types of services.

When the agents are providing their respective functionalities, the agents may utilize state information regarding the states of other agents. For example, information regarding a state of another agent may be used by an agent to determine a course of action to take or otherwise modify its behavior. The state of an agent may indicate the past, current, and/or future behavior of the agent.

A network device in accordance with embodiments disclosed herein may enable state information for any number of agents to be distributed to agents hosted by the network device and/or other devices by providing state information distribution services. State information distribution services may include obtaining state information from one or more agents and providing the obtained state information to one or more agents that desire to have access to the state information. The state information distribution services may be implemented in a disaggregated, data corruption tolerant, distributed, and/or asynchronous manner. By doing so, embodiments disclosed herein may provide a network device that is able to distribute state information in an environment in which data corruption may occur.

While each of the devices of FIG. 1.1 are illustrated as being operably connected to other devices using lines having double ended arrows as ends, such lines may represent any number of physical connections over which the network data units may be forwarded. For example, the line between the network device (10) and the network (20) may represent ten physical connections between the network device (10) and devices of the network (20). In such a scenario, network data units received by the network device (10) may be forwarded towards the network (20) and/or the other network devices (30) using any of the ten physical connections.

In another example, the line between the network device (10) and the network (20) may represent a connection between the network device (10) and another device (not shown) which is, in turn, physically connected to a device of the network (20). In such a scenario, network data units received by the network device (10) may be forwarded towards the network (20) and/or other network devices (30) using the connection to the other device (not shown) and the connection between the other device and the device of the network (20).

Any of the components of FIG. 1.1 may be operably connected by any combination and/or number of wired and/or wireless connections.

As discussed above, the system of FIG. 1.1 may include network devices that may provide network data unit forwarding services and/or state information distribution services. Any of the devices of FIG. 1.1 may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 2.1-3. The devices of FIG. 1.1 may be implemented using other types of computing devices without departing from the embodiments disclosed herein. For additional details regarding computing devices, refer to FIG. 5.

The devices of FIG. 1.1 may be implemented using logical devices without departing from the embodiments disclosed herein. For example, the devices of FIG. 1.1 may be implemented using virtual machines that utilize computing resources of any number of physical computing devices to provide their respective functionalities. The devices of FIG. 1.1 may be implemented using other types of logical devices without departing from the embodiments disclosed herein.

For example, the functionality of the network device (10) may be performed by a virtual machine, or another type of logical entity, that provides the functionality of the network device (10) discussed throughout this application.

The devices of FIG. 1.1 may be implemented using general computing devices such as, for example, servers. In such a scenario, the functionality of the network device (10) such as, for example, network data unit forwarding functionality may be performed by computing devices that do not include specialized hardware for the specialized functionality of the network device (10). The specialized functionality may be, for example, implemented in software.

To further clarify aspects of network devices, a diagram of a network device (10) is provided in FIG. 1.2. Any of the network devices of FIG. 1.1 may be may be similar to the network devices illustrated in FIG. 1.2.

FIG. 1.2 shows a logical diagram of a network device (10) in accordance with one or more embodiments described herein. The network device (10) may provide any number of functionalities (e.g., services), including network data unit forwarding functionality and stat information distribution functionality.

To provide the above noted functionality of the network device (10), the network device (10) may include agents (102), message buses (104), a network data unit processor (106), and storage (110). Each of these components of the network device (10) is discussed below.

In one or more embodiments disclosed herein, one or more of the agents (102) is implemented using a hardware device including circuitry. The agents (102) may include, for example, a digital signal processor, a field programmable gate array, and/or an application specific integrated circuit. The circuitry of the aforementioned devices may be adapted to provide the functionality of the agents (102). The agents (102) may be implemented using other types of hardware devices without departing from the embodiments disclosed herein.

In one or more embodiments disclosed herein, one or more of the agents (102) is implemented using computing code stored on a persistent storage that when executed by a processor of the network device (10) performs the functionality of the agents (102). The processor may be a hardware processor including circuitry such as, for example, a central processing unit or a microcontroller. The processor may be other types of hardware devices for processing digital information without departing from the embodiments disclosed herein.

In one or more embodiments disclosed herein, the agents (102) provide computer implemented services. The computer implemented services may be any type and/or quantity of computer implemented service. For example, the computer implemented services provided by the agents (102) may include (i) obtaining information regarding a network environment in which the network device (10) resides, (ii) processing the obtained information to determine how to forward network data units, and/or (iii) providing other types of services that enable the network device (10) to provide any type and/or quantity of services.

When providing computer implemented services, any of the agents (102) may modify the manner in which computer implemented services are performed based on the state of other entities (e.g., other agents hosted by the network device (10), other network devices, or other types of devices). In other words, the behavior of the agents (102) may depend on the state of other entities.

To modify the behaviors of the agents (102) based on the states of other entities, the agents (102) may need to be able to determine the state of other entities. In other words, one or more of the agents (102) may need access to state information regarding the states of one or more other entities to provide their own functionalities.

To enable the agents (102) to determine the state of other entities, embodiments disclosed herein may provide a system for distributing state information. The method may be implemented in a disaggregated, data corruption tolerant, distributed, and/or asynchronous manner. Specifically, one or more of the agents (102) may interact with one or more of the message buses (104) to (i) generate a distributed data structure that includes state information regarding the states of the one or more agents (102), (ii) update the distributed data structure based on changes to the states of the one or more agents (102), (iii) determine which entities desire to access state information, and/or (iv) notify the entities that desire access to the state information of updates made to the distributed data structure. By doing so, entities that desire access to state information of an agent may be provided the information in a computationally efficient manner.

For example, the notifications regarding the updates may only include differential state information (i.e., information reflecting changes to a state of an entity rather than the current state) rather than information reflecting the current state of an agent. Consequently, the notifications may include smaller amounts of data which reduce the computational cost (e.g., processor cycles, memory capacity, storage capacity, network bandwidth, etc.) of notifying other entities of the current state of an agent.

Additionally, embodiments disclosed herein may provide a method for enabling entities that are unsure of the current state of an entity to ascertain the state of the entity. As discussed above, notifications that include state information may include differential state information rather than absolute state information (i.e., information reflecting the state of an agent at a point in time). Consequently, the current state of an entity may not be able to be ascertained based on a single notification that includes state information. Rather, all of the notifications that include state information associated with an agent may be required to ascertain the state of an entity at any point in time.

The method may include (i) sending a request from an entity to an agent for which state information is desired, (ii) upon receipt of the request, sending state update messages for all of the state updates that have been made to the distributed data structure by the entity, and/or (iii) notifying entities that desire to obtain all previously made updates to the distributed data structure by the entity of the updates. By doing so, an entity that desires to ascertain the state of an agent may obtain any number of updates that may be used to reconstruct the state of the agent over time.

To provide the above noted functionality of the agents (102) and/or the message buses (104), the agents (102) and/or the message buses (104) may perform all, or a portion, of the methods illustrated in FIGS. 2.1-3. When providing the above noted functionalities, the agents (102) and/or the message buses (104) may utilize data structures stored in storage (110). Utilizing the data structures may include, for example, reading portions of the data structures, modifying portions of the data structures, and/or adding additional data to the data structures.

In one or more embodiments disclosed herein, one or more of the message buses (104) is implemented using a hardware device including circuitry. The message buses (104) may include, for example, a digital signal processor, a field programmable gate array, and/or an application specific integrated circuit. The circuitry of the aforementioned devices may be adapted to provide the functionality of the message buses (104). The message buses (104) may be implemented using other types of hardware devices without departing from the embodiments disclosed herein.

In one or more embodiments disclosed herein, one or more of the message buses (104) is implemented using computing code stored on a persistent storage that when executed by a processor of the network device (10) performs the functionality of the message buses (104). The processor may be a hardware processor including circuitry such as, for example, a central processing unit or a microcontroller. The processor may be other types of hardware devices for processing digital information without departing from the embodiments disclosed herein.

In one or more embodiments disclosed herein, the message buses (104) provide state information distribution services. Providing state information distribution services may include (i) identifying portions of state information (e.g., 112) that may be of interest to one or more agents and (ii) providing updates to the one or more agents regarding the portions of the state information. The updates provided by the message buses (104) may include differential state information. Differential state information may reflect a change to the state of an entity (e.g., an agent) at a particular point in time (or over a particular period of time).

To provide state information distribution services, the agents (102) may maintain subscription information (114) that specifies which agents are interested in different portions of the state information (112). To maintain the subscription information, the message buses (104) may obtain messages or other indications reflecting the interests of the agents (102) and/or other entities and store such information as part of the subscription information (114).

The message buses (104) may distribute state information to other entities when prompted to do so by the agent that generated the state information and/or other entities. For example, when an agent updates a portion of the state information (e.g., 112) stored in storage (110), the agent may send a message to a message bus that provides state information distribution services for the agent. The aforementioned message may prompt the message bus to distribute state information (e.g., a portion of differential state information corresponding to the update) to entities that have subscribed to receive state information regarding the agent. By doing so, the entities that have subscribed to receive the state information regarding the agent may be made aware of the change in the state of the agent.

In another example, a first agent that has lost track of the state of a second agent may send a request to the second agent to provide it with sufficient state information so that the first agent is able to reconstruct the current state of the second agent. In response, the second agent may send a request to a message bus that provides state information distribution services to the second agent. In turn, the aforementioned message may prompt the message bus to distribute state information (e.g., all differential state information associated with the second agent) to entities that have subscribed to receive state information regarding the agent. By doing so, the first agent may receive sufficient agent to reconstruct the state of the second agent.

In one or more embodiments disclosed herein, the network data unit processor (106) is implemented using a hardware device including circuitry. The network data unit processor (106) may include, for example, a digital signal processor, a field programmable gate array, and/or an application specific integrated circuit. The circuitry of the aforementioned devices may be adapted to provide the functionality of the network data unit processor (106). The network data unit processor (106) may be implemented using other types of hardware devices without departing from the embodiments disclosed herein.

In one or more embodiments disclosed herein, the network data unit processor (106) is implemented using computing code stored on a persistent storage that when executed by a processor performs the functionality of the network data unit processor (106). The processor may be a hardware processor including circuitry such as, for example, a central processing unit or a microcontroller. The processor may be other types of hardware devices for processing digital information without departing from the embodiments disclosed herein.

In one or more embodiments disclosed herein, the network data unit processor (106) provides network data unit processing services. Providing network data unit processing services may include (i) determining whether a network data unit should be forwarded, (ii) determining a method for forwarding a network data unit that should be forwarded based on information included in forwarding information (not shown), and/or (iii) forwarding the network data unit in accordance with the determined method for forwarding a network data unit. Determining the method for forwarding the network data unit may include, for example, identifying an egress port, encapsulating information, and/or other actions to be performed to forward the network data unit.

To provide the aforementioned functionality, the network data unit processor (106) may rely on the agents (102) to (i) provide information (e.g., data structures stored in the storage (110) that are not illustrate in FIG. 1.2) that the network data unit processor (106) may use to forward network data units, (ii) manage the operation of the network device (10), and/or (iii) provide computer implemented services which the network data unit processor (106) utilizes.

In one or more embodiments disclosed herein, the storage (110) is implemented using devices that provide data storage services (e.g., storing data and providing copies of previously stored data). The devices that provide data storage services may include hardware devices and/or logical devices. For example, the storage (110) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, the storage (110) may include a memory device (e.g., a dual in line memory device) in which data is stored and from which copies of previously stored data are provided. In another example, the storage (110) may include a persistent storage device (e.g., a solid state disk drive) in which data is stored and from which copies of previously stored data is provided. In a still further example, the storage (110) may include a memory device (e.g., a dual in line memory device) in which data is stored and from which copies of previously stored data are provided and a persistent storage device that stores a copy of the data stored in the memory device (e.g., to provide a copy of the data in the event that power loss or other issues with the memory device that may impact its ability to maintain the copy of the data cause the memory device to lose the data).

The storage (110) may store data structures including state information (112) and subscription information (114). Each of these data structures is discussed below.

The state information (112) may be a distributed date structure. In other words, the state information (112) may include any number of separate state information chunks (e.g., 112.2, 112.4). The state information (112) may include information regarding the state of agents (102) and/or other entities hosted by the network device (10).

Each of the state information chunks (e.g., 112.2, 112.4) may include state information associated with a corresponding entity. Each of the state information chunks may only include state information regarding the corresponding entity. For example, a first state information chunk may include state information regarding the state of a first agent while a second state information chunk may include state information regarding the state of a second agent. The state information (112) may include any number of state information chunks associated with any number of corresponding entities (e.g., the agents (102)).

Each of the state information chunks may be managed exclusively (e.g., authorized to modify, delete, read, etc.) by corresponding entities. To be exclusively managed, each of the state information chunks may only be editable by an entity for which the respective state information chunk stores state information. For example, a state information chunk that includes state information of a first agent may only be edited (e.g., deleted, modified) by the first agent. By managing each state information chunk exclusively by corresponding entities, embodiments disclosed herein may provide a method for distributing management responsibilities for state information across the distributed system. Consequently, a failure of any entity with respect to state information may not degrade the ability of the system to manage state information throughout the system.

In one or more embodiments disclosed herein, the state information chunks are stored in address spaces allocated to the corresponding entities. The state information chunks may be stored as objects. When other entities desire access to the state information chunks of a particular entity, copies of the state information chunks may be provided to the requesting entities. In other words, copies of the state information chunks may be provided to other entities rather than allowing the other entities to read the state information chunks associated with the particular entity in the particular entity's allocated address space.

In one or more embodiments disclosed herein, each of the state information chunks is exclusively associated with a corresponding entity. For example, each of the state information chunks may include information regarding the state of only the entity associated with the state information chunk.

For additional information regarding state information chunks, refer to FIG. 1.3.

The subscription information (114) may be a data structure that includes information regarding which entities are interested in the states of other entities. For example, the subscription information (114) may specify the entities that desire to be notified of changes to the state of a particular agent. In other words, the subscription information (114) may specify, for each entity for which state information (112) is stored in the storage (110), which entities desire to be notified of changes to the state of the respective entities.

The subscription information (114) may also include information regarding which entities are interested in being provided information that may enable the state of an entity to be reconstructed. In other words, the subscription information (114) may specify (in addition to entities that desire to be notified of state changes) which entities desire to receive state information when a state reconstruction request is processed. For additional details regarding processing of a state reconstruction request, refer to FIG. 2.2.

The subscription information (114) may be implemented as a table that associates entities that desire state information with corresponding entities. For example, the table may use identifiers of entities that are keyed to identifiers of other entities that desire to obtain state information from the keyed entities. The subscription information (114) may be implemented using other types of data structures (e.g., lists, linked lists, etc.) without departing from the embodiments disclosed herein.

While the data structures stored in the storage (110) have been described as including a limited amount of specific information, any of the data structures stored in the storage (110) may include additional, less, and/or different information without departing from the embodiments disclosed herein. Further, the aforementioned data structures may be combined, subdivided into any number of data structures, may be stored in other locations (e.g., in a storage hosted by another device), and/or spanned across any number devices without departing from the embodiments disclosed herein.

Additionally, while the network device (10) has been illustrated as including a limited number of specific components, a network device (10) in accordance with embodiments disclosed herein may include fewer, different, and/or additional components.

As discussed above, the network device (10) of FIG. 1.2 may maintain state information (112) that includes state information chunks. FIG. 1.3 shows a diagram of a state information chunk in accordance with embodiments disclosed here. As discussed above, a state information chunk may be a data structure that includes information regarding the state of a corresponding entity (e.g., an agent).

To store state information, the state information chunk (e.g., 112.2) may include any number of portions (e.g., 120, 122). Each of the portions (e.g., 120, 122) may include information reflecting a corresponding portion of the state of an associated entity.

For example, the state of an entity may be multidimensional in nature. Each dimension of the state may, in totality with the other dimensions of the state, indicate the future behavior of the entity. The state information chunk may include a number of portions corresponding to the number of dimensions of the state of the corresponding entity.

Each portion (e.g., 120, 122) of the state information chunk may include any number of updates that have been made to the portion over time. In other words, rather than modifying the data of the portion reflecting a dimension of the state of a corresponding entity, a new update (e.g., 120.2, 120.4, 122.2, 122.4) may be added to the associated portion. By doing so, a history of changes in the state of an entity may be recorded for future use.

While not illustrated in FIG. 1.3, each state information chunk (e.g., 112.2) may include ordering information that specifies an ordering of each of the updates made to each of the portions. The ordering information may be, for example, a relative ordering (e.g., a first update was stored before a second update in a portion) between the updates (e.g., 120.2, 120.4). The ordering may reflect the ordering in which the updates were added to a portion over time.

The ordering information may also (or alternatively) associate the updates with different points in time. For example, each of the updates may be associated with points in time at which the updates were added to the respective portions. By including such information, the order in which of the portions was added to a state information chunk may be determined. As will be discussed below, such information may be used when a state reconstruction request is processed to ensure that the updates are processed in an order reflecting the order in which the updates were added to the state information. The aforementioned order may correspond to the order, over time, in which changes to the state of a corresponding entity were made to the entity.

As discussed above, message buses (e.g., 104, FIG. 1.2) may distribute state information to entities that desire to receive state information. FIGS. 2.1-2.2 show diagrams of methods that may be performed by a message bus in accordance with one or more embodiment disclosed herein when distributing state information.

FIG. 2.1 shows a flowchart describing a method for distributing state information when a state information chunk is updated in accordance with one or more embodiments disclosed herein. The method may be performed by, for example, a message bus (e.g., 104, FIG. 1.2) of a network device. Other entities may perform the method of FIG. 2.1 without departing from embodiments disclosed herein.

While the various steps in the flowchart shown in FIG. 2.1 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel or partially overlapping in time manner.

In step 200, an update that is added to a state information chunk that is associated with a first agent is identified.

In one or more embodiments disclosed herein, the update is added to the state information chunk by the first agent. For example, when the state of the first agent changes, the first agent may add information to a state information chunk associated with the first agent as the update. The update may reflect the change to the state of the first agent.

For example, the update may include changes to configuration information of first agent. In another example, the update may include changes to a data structure which the first agent manages. The data structure may be utilized by any number of entities. The update may include different types of information without departing from embodiments disclosed herein.

In one or more embodiments disclosed herein, identification of the update is prompted by the first agent. For example, the first agent may notify a message bus assigned to distribute state information from the first agent that the state of the first agent has changed.

In one or more embodiments disclosed herein, the update is identified using ordering information. As discussed with respect to FIG. 1.3, ordering information may be available and the ordering information may indicate which portions of a state information chunk have been added. For example, the ordering information may be used to discriminate new updates from other updates that already have been distributed by enabling the most recently added update to be identified, the second most recently added update to be identified, etc.

In one or more embodiments disclosed herein, the message bus maintains information regarding the portions of the state information chunk that have been previously distributed to subscribed entities. By doing so, the message bus may utilize the information regarding the distributed portions to discriminate the other portions of the state information chunk that have not yet been distributed. When used in combination with the ordering information, the message bus may identify the most recently but not yet distributed updates and sequentially distribute the updates that have not yet been distributed in the order that the updates were added to the state information chunk.

In Step 202, at least one second agent that is subscribed to the state information chunk is identified.

In one or more embodiments disclosed herein, the at least one second agent is identified using subscription information (e.g., 114, FIG. 1.2). As discussed above, the subscription information may associate entities that are subscribed to each agent. An identity of the at least one second agent may be used as a key to identify the at least one second agent.

Additionally, as discussed above, the subscription information may specify two groups of entities that are interested in obtaining state information for a particular entity. The first of the two groups may desire to be provided with updates to the state of the particular entity. The second of the two groups may desire to be provided with information (e.g., all updates) that enables the state of the particular entity to be reconstructed. Some entities may be members of both groups. In step 202, the message bus may use the members of the first of the two groups as the at least one second agent.

In Step 204, an action set, based on the update, is performed to notify the at least one second agent of a new state of the first agent.

In one or more embodiments disclosed herein, the at least one action set includes sending a copy of the update to each of the at least one second agent. The copy may be sent using multicast distribution of a message that includes the copy of the update.

For example, the message bus may provide a point to multipoint delivery service. The point to multipoint delivery service may facilitate transmission of data units (e.g., application-layer frames) over a transport protocol (e.g., transmission control protocol). Any entities (e.g., the second agent) that desire to receive state information regarding the first agent may open a connection to the message bus prior to receiving the state information. By doing so, the message bus may broadcast or otherwise distribute the state information using the open connections to the entities.

The method may end following Step 204.

By distributing state information, as illustrated in FIG. 2.1, embodiments disclosed herein may enable any number of entities to be notified of changes to the states of other entities.

FIG. 2.2 shows a flowchart describing a method for servicing a state reconstruction request in accordance with one or more embodiments disclosed herein. The method may be performed by, for example, a message bus (e.g., 104, FIG. 1.2) of a network device. Other entities may perform the method of FIG. 2.1 without departing from embodiments disclosed herein.

While the various steps in the flowchart shown in FIG. 2.1 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel or partially overlapping in time manner.

In Step 210, a state reconstruction request for a first agent is obtained.

In one or more embodiments disclosed herein, the state reconstruction request is obtained from the first agent. The request may be obtained by receiving a message from the first agent indicating that the state of the first agent is to be reconstructed. The first agent may send the message in response to receipt of a state reconstruction request from a second agent.

In one or more embodiments disclosed herein, the state reconstruction request is obtained from a second agent. The request may be obtained by receiving a message from the second agent indicating that the state of the first agent is to be reconstructed.

In Step 212, at least two updates of a state information chunk associated with the first agent are identified.

In one or more embodiments disclosed herein, the at least two updates of the state information chunk are identified based on the updates that have been made to the state information chunk. As discussed with respect to FIG. 1.3, a state information chunk may include all updates that have been made to the state of an entity. In other words, all (or a portion) of the information included in the state information chunk may be identified as the at least two updates.

Additionally, as discussed above, a single state information chunk may be associated with a corresponding entity. Accordingly, the aforementioned association may be used to identify the state information chunk. For example, each state information chunk may include an identifier of a corresponding entity.

In Step 214, an ordering of the at least two updates is identified based on the state information chunk. As discussed above, ordering information with respect to each update included in a state information chunk may be available. The ordering information may specify the order in which each of the updates included in the state information chunk were added to the state information chunk. The order in which the updates were added to the state information chunk may reflect the order in which changes to the state of the first agent were made over time.

In Step 216, an action set, based on the at least two updates and the order, is performed to notify at least one second agent of the state of the first agent.

In one or more embodiments disclosed herein, the action set may include (i) identifying the one or more second entities and (ii) sending copies of the updates to the one or more second entities in the order the updates were added to the state information chunk.

In one or more embodiments disclosed herein, the one or more second entities are identified using subscription information (e.g., 114, FIG. 1.2). As discussed above, the subscription information may specify two groups of entities that are interested in obtaining state information for a particular entity. The first of the two groups may desire to be provided updates to the state of the particular entity. The second of the two groups may desire to be provided information (e.g., all updates) that enables the state of the particular entity to be reconstructed. Some entities may be members of both groups. In step 202, the message bus may use the members of the second of the two groups as the at least one second agent.

To send copies of the updates to the one or more second entities, as discussed above, the message bus may provide a point to multipoint delivery service. The point to multipoint delivery service may facilitate transmission of data units (e.g., application-layer frames) over a transport protocol (e.g., transmission control protocol). Any entities (e.g., the second agent) that desire to receive information that may enable the state of the first agent to be reconstructed may open a connection to the message bus prior to servicing of the state reconstruction request. By doing so, the message bus may broadcast or otherwise distribute the copies of the updates to the one or more second entities in the order the updates were added to the state information.

The method may end following Step 216.

By distributing all of the updates made to a state information chunk, as illustrated in FIG. 2.2, embodiments disclosed herein may enable any number of entities to reconstruct the state of an entity.

As discussed above, embodiments disclosed herein may provide a method for distributing state information. To distribute the state information, the state information may be maintained by corresponding entities. For example, as discussed above, each state information chunk may be exclusively managed by a corresponding entity that maintains its state information in the state information chunk.

FIG. 3 shows a flowchart describing a method for maintaining state information in accordance with one or more embodiments disclosed herein. The method may be performed by, for example, an agent (e.g., 102, FIG. 1.2) of a network device. Other entities may perform the method of FIG. 3 without departing from embodiments disclosed herein.

While the various steps in the flowchart shown in FIG. 3 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel or partially overlapping in time manner.

In Step 300, a state change of an agent is identified.

In one or more embodiments disclosed herein, the agent identifies the state change. In other words, as the agent changes its state, the agent may identify the change to its state. For example, as configuration information or other types of data structures that the agent uses in its operation are modified, the agent may identify the aforementioned modifications as changes to its state.

The state change may be identified by other agents without departing from the agent. For example, a separate agent may monitor the agent to identify modifications to the state of the agent. To do so, the separate agent may modify agent data that reflects the operating state of the agent.

In Step 302, at least one update is added to a state information chunk associated with the agent.

In one or more embodiments disclosed herein, the agent adds the at least one update (e.g., 120.2, 120.4) to a portion (e.g., 112.2) of the state information chunk. As discussed with respect to FIG. 1.3, a state information chunk may reflect multidimensional state information of the agent. Each of the portions of the state information chunk may reflect a different dimension of the state information of the agent. When a change to a dimension of the state of the agent is made, an update corresponding to the change may be added to the portion corresponding to the changed dimension of the state information.

For example, with respect to FIG. 1.3, consider a scenario in which Portion A (120) is associated with a dimension of a state of a database agent that indicates whether the database agent is consuming new information in its operation. At a first point in time, the database agent may not be consuming new information. Consequently, the update A (120.2) may include a first flag change (e.g., a flag may indicate a consuming/non-consuming state of the database agent) to indicate that the database agent is not consuming new information. In other words, not adding new information to the database that the database agent manages.

At a second point in time following the first point in time, the database agent may begin consuming new information. Consequently, an update B (not shown) may include a second flag change indicating that the database agent is consuming new information. In other words, modifying the contents of the database by adding new data, modifying data in the database, and/or removing data from the database. Thus, the update A and the update B may indicate the relative changes (i.e., flag changes) in the state of the database agent.

At a third point in time, the database agent begins to perform garbage collection on the database because the database has reached a storage limit. When doing so, the database agent adds update A (122.2) to portion N (122). In contrast to portion A (120), which represents the data consumption state of the database agent, portion N (122) may represent the garbage collection state of the database. That is, whether the database agent is performing garbage collection. The update A (122.2) may include a flag change (e.g., a flag that may indicate a garbage collecting/not garbage collecting state of the database agent) to indicate that the database agent is actively performing garbage collection. Thus, the state information chunk (112.2) may include multiple portions (e.g., 120, 122) that each represent separate dimensions of the state of the database agent.

Returning to FIG. 3, in Step 304, a message bus is notified of the addition of the at least one update to the data chunk.

In one or more embodiments disclosed herein, the agent notifies the message bus of the addition of the at least one update to the data chunk by sending a message indicating that an addition has been made to a state information chunk associated with the agent. The message may, for example, indicate that the state information chunk has been updated, specify one or more portions of the state information chunk that have been updated, and/or otherwise indicate that the state information chunk has been modified.

The method may end following Step 304.

By maintaining state information, as illustrated in FIG. 3, embodiments disclosed herein may enable other entities to be notified of the state of an entity.

By performing any and/or all of the methods illustrated in FIGS. 2.1-3, entities may modify their respective functionality over time based on state information. By doing so, embodiments disclosed herein may enable any number of entities to take into account the behaviors of other entities when providing their functionalities through efficient sharing of state information. Doing so may the entities may provide their functionalities more efficiently. For example, by taking into account the state of other entities, an entity may be able to selectively perform its functionality based on the states of other entities. Consequently, the computation cost for providing its functionality may be reduced by not providing its functionality during periods of time where performance of its functionality may not provide any benefits.

As discussed above, embodiments disclosed herein may be implemented using a network device. In one or more embodiments, a network device is implemented as a physical device that includes and/or is operatively connected to persistent storage (not shown), memory (e.g., random access memory (RAM)) (not shown), one or more processor(s) (e.g., integrated circuits) (not shown), and at least one physical network interface (not shown), which may also be referred to as a port. Examples of a network device (e.g., 10, FIG. 1.1) include, but are not limited to, a network switch, a router, a multilayer switch, a fiber channel device, an InfiniBand® device, etc. A network device (e.g., 10, FIG. 1.1) is not limited to the aforementioned specific examples.

In one or more embodiments, a network device (e.g., 10, FIG. 1.1) includes functionality to receive network data units (e.g., frames, packets, tunneling protocol frames, etc.) at any of the physical network interfaces (i.e., ports) of the network device (e.g., 10, FIG. 1.1) and to process the network traffic data units. In one or more embodiments, processing a network traffic data unit includes, but is not limited to, a series of one or more table lookups (e.g., longest prefix match (LPM) lookups, forwarding information lookups, etc.) and corresponding actions (e.g., forward from a certain egress port, add a labeling protocol header, rewrite a destination address, encapsulate, etc.). Such a series of lookups and corresponding actions may be referred to as a pipeline, and may, for example, be programmed as a match-action pipeline using the P4 programming language. Examples of pipeline processing include, but are not limited to, performing a lookup to determine: (i) whether to take a security action (e.g., drop the network traffic data unit); (ii) whether to mirror the network traffic data unit; and/or (iii) determine how to route/forward the network traffic data unit in order to transmit the network traffic data unit from an interface of the network device (e.g., 10, FIG. 1.1).

In one or more embodiments, a network device (e.g., 10, FIG. 1.1) also includes and/or is operatively connected to device persistent storage and/or device memory (i.e., non-transitory computer readable mediums used to provide persistent storage resources and/or memory resources) storing software and/or firmware.

Such software and/or firmware may include instructions which, when executed by the one or more processors) of a network device (e.g., 10, FIG. 1.1), cause the one or more processors to perform operations in accordance with one or more embodiments described herein.

The software instructions may be in the form of computer readable program code to perform embodiments described herein, and may be stored, in whole or in part, temporarily or permanently, on a non-transitory computer readable medium such as a CD, DVD, storage device, a diskette, a tape, flash memory, physical memory, or any other non-transitory computer readable medium.

In one or more embodiments, the network device (e.g., 10, FIG. 1.1) is part of a network (e.g., 10, 20, 30, FIG. 1.1). A network may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. In one or more embodiments, the network may be coupled with or overlap, at least in part, with the Internet.

In one or more embodiments, a network includes a collection of one or more network devices (e.g., network device (e.g., 10, FIG. 1.1)) that facilitate network connectivity for one or more operatively connected devices (e.g., computing devices, data storage devices, other network devices, etc.). In one or more embodiments, the network device (e.g., 10, FIG. 1.1) and other devices within the network (not shown) are arranged in a network topology (not shown). In one or more embodiments, a network topology is an arrangement of various elements of a network.

In one or more embodiments, a computing device is any device or any set of devices capable of electronically processing instructions and may include, but is not limited to, any of the following: one or more processors (not shown), memory (e.g., random access memory (RAM)) (not shown), input and output device(s) (not shown), persistent storage (not shown), one or more physical interfaces (e.g., network ports) (not shown), any number of other hardware components (not shown) or any combination thereof. Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a network device (e.g., switch, router, multi-layer switch, etc.) such as that described above and below, a virtual machine, and/or any other type of computing device with the aforementioned requirements.

To further clarify embodiments disclosed herein, a non-limiting example is provided in FIGS. 4.1-4.3. FIG. 4.1 may illustrate a system similar to that illustrated in FIG. 1.1. FIGS. 4.2-4.3 may illustrate interactions between components of the system of FIG. 4.1 over time. For the sake of brevity, only a limited number of components of the system of FIG. 1.1 are illustrated in each of FIGS. 4.1-4.3.

Example

Consider a scenario as illustrated in FIG. 4.1 in which a network device (400) is providing network data unit forwarding services to other entities (not shown). To provide the network data forwarding services, the network device (400) includes a network data unit processor (405) that utilizes forwarding information (not shown) to decide how (e.g., encapsulation, egress port, etc.) to forward network data units.

The network device (400) may also include a forwarding information manager (403) that maintains the forwarding information. For example, the forwarding information manager (403) may modify the contents of the forwarding information to maintain the forwarding information. When modifying the contents of the forwarding information, the forwarding information manager (403) may utilize data provided by a network discovery packet analyzer (402). Because the network discovery packet analyzer (402) may not be constantly providing data, the forwarding information manager (403) may desire to be notified of changes to the state of the network discovery packet analyzer (402). Such changes may indicate whether the network discovery packet analyzer (402) has, is currently, or will be providing data to the forwarding information manager (403).

To reduce its computational resource use, the forwarding information manager (403) may selectively modify its operation based on the state of the network discovery packet analyzer (402). When the state of the network discovery packet analyzer (402) indicates that it is likely to provide data, the forwarding information manager (403) may change its state to a higher computational resource use state in which it performs a higher level of processing when updating forwarding information. In contrast, when the network discovery packet analyzer (402) changes its state to a state in which it will not provide data, the forwarding information manager (403) may change its state to a lower computational resource use state in which it performs a lower level of processing when updating the forwarding information.

As noted above, the network discovery packet analyzer (402) may provide data which the forwarding information manager (403) may utilize. To provide such data, the network discovery packet analyzer (402) may obtain packets (e.g., a protocol specific type of network data units) that include information regarding the network environment in which the network device (400) resides. The network discovery packet analyzer (402) may analyze the information included in the packets to produce a data structure that represents the network environment in which the network device (400) resides. However, packets that include information regarding the network environment may be obtained by the network discovery packet analyzer (402) intermittently. Consequently, the network discovery packet analyzer (402) may periodically be in a waiting state rather than a packet processing state.

To provide other entities that desire access to its state, the network discovery packet analyzer (402) may store state information regarding its state in a network discovery analyzer state information chunk (407.2) of state information (407) storage in storage (406) of the network device (400).

To distribute state information regarding the network discovery packet analyzer (402), the network device (400) may include a message bus (404). The message bus (404) may utilize subscription information (408) to determine which entities desire access to state information regarding the state of the network discovery packet analyzer (402).

At the point in time illustrated in FIG. 4.1, the subscription information (408) indicates that the forwarding information manager (403) desires access to both (i) updates to the state of the network discovery packet analyzer (402) and (ii) information that enables the forwarding information manager (403) to reconstruct the state of the network discovery packet analyzer (402). In FIG. 4.1, this relationship is indicated by the arrows having dashed tails between the network discovery packet analyzer (402), the message bus (404), and the forwarding information manager (403).

Turning to FIGS. 4.2-4.3, the aforementioned figures illustrate interactions between select components of the system of FIG. 4.1 as well as actions performed by these components. In these figures, the relative occurrence of interactions and actions progresses from the top of each figure (i.e., earlier in time) to the bottom of each figure (i.e., bottom of the figure). FIG. 4.3 is a continuation of the diagram of FIG. 4.2. In other words, element 410 indicates the first interaction that occurs while element 434 indicates the last action that is performed.

Returning to FIG. 4.2, at a first point in time, the state of the network discovery packet analyzer (402) changes from a low resource consumption state to a high resource consumption state because packets were obtained that include network topology information. The state of the network discovery packet analyzer (402) due to the computational cost of analyzing the obtained packets.

In response to the state change, the network discovery packet analyzer (402) generates a state update (410) and sends the state update (410) to the storage (406). In response to receiving the state update (410), the storage (406) stores the update (412) as part of a state information chunk associated with the network discovery packet analyzer (402). Specifically, the storage (406) adds the state update to a portion of the state information chunk that stores previous updates to the portion of the state information chunk that indicates the resource consumption state of the network discovery packet analyzer (402).

After sending the state update (410), the network discovery packet analyzer (402) sends a state update notification (414) to the message bus (404). The state update notification (414) indicates that at least a portion of the state information chunk associated with the network discovery packet analyzer (402) has been updated.

In response to receiving the state update notification (414), the message bus (404) sends a request to obtain the update (416) to the storage (406). Specifically, the request indicates that additions to the state information chunk are to be provided to the message bus (404). In response to receiving the request to obtain the update (416), the storage (406) provides a copy of the update (418) to the message bus (404).

After receiving the copy of the update (418), the message bus (404) multicasts copies of the update (418) to all entities that are subscribed to receive updates to the state of the network discovery packet analyzer (402), including the forwarding information manager (403).

After receiving the update (418), the forwarding information manager (403) modifies its state (420) based on the update (418). Specifically, the forwarding information manager (403) enters a low computing resource consumption state to reduce its use of computing resources (which would otherwise be consumed without providing any benefits).

After entering the low computing resources state, the forwarding information manager (403) unexpectedly enters a failure state (422) due to an underlying hardware issue. For a period of time after entering the failure state (as illustrated by the break in the vertical lines in FIG. 4.2), the forwarding information manager (403) remains in the failure state and is unable to utilize updates (423) (indicated by the arrow having a dashed tail) that may have been provided to any number of entities by the message bus (404).

At a second point in time, the forwarding information manager (403) is reinitialized and enters a normal state (424). After entering the normal state (424), the forwarding information manager is unaware of whether the network discovery packet analyzer (402) has changed its state while the forwarding information manager (403) was in the failure state (422).

To determine the state of the network discovery packet analyzer (402), the forwarding information manager (403) sends a reconstruction request (425) to the network discovery packet analyzer (402). In response to receiving the reconstruction request (425), the network discovery packet analyzer (402) sends a reconstruction request (425) to the message bus (404).

Turning to FIG. 4.3, the message bus (404) sends a request to obtain all updates (428) associated with the network discovery packet analyzer (402) to the storage (406) in response to receiving the reconstruction request (425). The storage (406) provides all of the updates (430) associated with the network discovery packet analyzer (402) to the message bus (404) in response to the request. Additionally, the storage (406) provides ordering information for the updates. The updates include, for example, the stored update (412) and number of updates (423) that were made while the forwarding information manager (403) was in the failure state (422).

After obtaining all of the updates (430), the message bus (404) sends the updates to the forwarding information manager (403) in the order that the updates were stored in the storage (406). For example, the message bus (404) may provide the forwarding information manager (403) a first update (432) reflecting a change to the first state of the network discovery packet analyzer (402), any number of other updates, and a last update (434).

Upon receiving the updates (432, 434), the forwarding information manager (403) performs a state reconstruction (436) using the updates (432, 434). To do so, the forwarding information manager (403) applies the first update (432) through the last update (434) to a data structure reflecting the state of the network discovery packet analyzer (402) in the order that the updates were stored in the storage (406). By doing so, the resulting data structure may include information reflecting the current state of the network discovery packet analyzer (402).

End of Example

Figure 5:
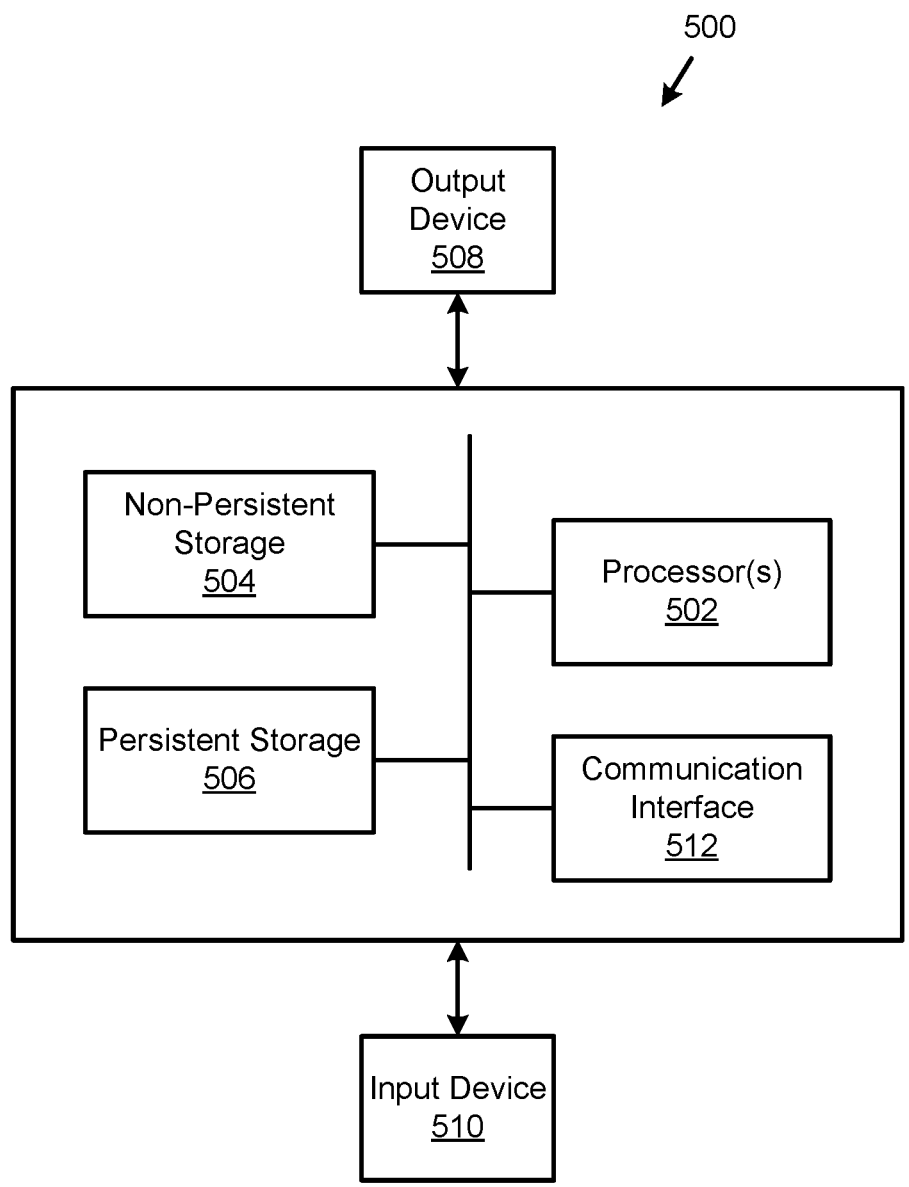
FIG. 5 shows a diagram of a computing device in accordance with one or more embodiments disclosed herein.

As discussed above, embodiments disclosed herein may be implemented using computing devices. FIG. 5 shows a diagram of a computing device in accordance with one or more embodiments disclosed herein. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment disclosed herein, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment disclosed herein, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

Embodiments disclosed herein may provide a network device and/or method that enables state information to be distributed. To do so, a distributed date structure for storing state information may be utilized. The distributed data structure may include any number of portions stored in any number of locations. Each of the portions (e.g., state information chunks) may store state information for a corresponding entity. Each of the portions may be independently and exclusively managed by the corresponding entities. By distributing the state information across independently managed data structures, centralized points of failure may be avoided. Consequently, state information distribution in accordance with embodiments disclosed herein may be less susceptible to total failure caused by data corruption or other threats that may impair the ability of single of failure system (e.g., centrally managed system) to continue to operate after a failure.

Additional embodiments disclosed herein may provide a method and system for distributing state information that is disaggregated and operates asynchronously. For example, a system in accordance with embodiments may utilize any number of message busses that may separately and independently facilitate distribution of state information.

Thus, embodiments disclosed herein may address the problem of total system failures caused by failures of portions of a system. In contrast, the disaggregated, asynchronous, and independent operation of the entity of a state information distribution system in accordance with embodiments disclosed herein may be tolerant of partial system failures. By doing so, the system may be capable of continuing to provide state information distribution services while portion of the system is in a failure state. While embodiments have been described as addressing one or more specific challenges relating to network environments, embodiments disclosed herein are broadly applicable to addressing many networking challenges and the embodiments should not be construed as only addressing or being usable to solve the specific challenges discussed above.

While embodiments described herein have been described with respect to a limited number of embodiments, those skilled in the art, having benefit of this disclosure, will appreciate that other embodiments can be devised which do not depart from the scope of embodiments disclosed herein. Accordingly, the scope embodiments described herein should be limited only by the attached claims.

What is claimed is:

1. A network device, comprising:
a processor;
a first process executing on the processor that provides a functionality of the network device; and
a second process executing on the processor, the second process being distinct from the first process, that:
identifies an update associated with the first process, wherein the update comprises differential state information based, at least in part, on a state of the first process, wherein the state of the first process is stored in a data structure exclusively managed by the first process;
in response to identifying the update:
identifies a third process executing on the processor that is subscribed to the first process; and performs an action set to provide the third process with access to the update,
wherein the second process executing on the processor further:
obtains a state reconstruction request for the first process;
in response to obtaining the state reconstruction request:
identifies at least two updates associated with the first process;
identifies an ordering of the at least two updates; and
provides the at least two updates in an order specified by the ordering to at least a requesting entity.

2. The network device of claim 1, wherein the differential state information is further based, at least in part, on a second update that was generated before the update is generated.

3. The network device of claim 1, wherein performing the action set comprises:
multicasting the update to the third process and a fourth process executing on the processor.

4. The network device of claim 1, wherein the update is based on a state information chunk exclusively associated with the first process.

5. The network device of claim 4, wherein only the first process is authorized to modify the state information chunk.

6. The network device of claim 4, wherein identifying the update comprises:
obtaining a message from the first process indicating that the state information chunk has been updated;
in response to obtaining the message:
identifying an ordering of the state information chunk to discriminate the update from previous updates.

7. A method, comprising:
identifying, by a second process executing on a processor, an update associated with a first process executing on the processor, wherein the first process provides a functionality of a network device and the second process is distinct from the first process, wherein the update comprises differential state information based, at least in part, on a state of the first process, wherein the state of the first process is stored in a data structure exclusively managed by the first process;
in response to identifying the update, by the second process:
identifying a third process executing on the processor that is subscribed to the first process; and
performing an action set to provide the third process with access to the update, wherein the method further comprises, by the second process:
obtaining a state reconstruction request for the first process;
in response to obtaining the state reconstruction request:
identifying at least two updates associated with the first process;
identifying an ordering of the at least two updates; and
providing the at least two updates in an order specified by the ordering to at least a requesting entity.

8. The method of claim 7, wherein the differential state information is further based, at least in part, on a second update that was generated before the update is generated.

9. The method of claim 7, wherein performing the action set comprises:
multicasting the update to the third process and a fourth process executing on the processor.

10. The method of claim 7, wherein the update is based on a state information chunk exclusively associated with the first process.

11. The method of claim 10, wherein only the first process is authorized to modify the state information chunk.

12. The method of claim 10, wherein identifying the update comprises:
obtaining a message from the first process indicating that the state information chunk has been updated;
in response to obtaining the message:
identifying an ordering of the state information chunk to discriminate the update from previous updates.

13. A non-transitory computer readable medium comprising computer readable program code, which when executed by a computer processor enables the computer processor to perform a method, the method comprising:
identifying, by a second process executing on a processor, an update associated with a first process executing on the processor, wherein the first process provides a functionality of a network device and the second process is distinct from the first process, wherein the update comprises differential state information based, at least in part, on a state of the first-process, wherein the state of the first process is stored in a data structure exclusively managed by the first process;
in response to identifying the update, by the second process:
identifying a third process executing on the processor that is subscribed to the first process; and
performing an action set to provide the third process with access to the update, wherein the method further comprises, by the second process:
obtaining a state reconstruction request for the first process;
in response to obtaining the state reconstruction request:
identifying at least two updates associated with the first process;
identifying an ordering of the at least two updates; and
providing the at least two updates in an order specified by the ordering to at least a requesting entity.

14. The non-transitory computer readable medium of claim 13, wherein the differential state information is further based, at least in part, on a second update that was generated before the update is generated.

15. The non-transitory computer readable medium of claim 13, wherein performing the action set comprises:

multicasting the update to the second agent third process and a third agent fourth process executing on the processor.

16. The non-transitory computer readable medium of claim 13, wherein the update is based on a state information chunk exclusively managed by the first agent process.

17. The non-transitory computer readable medium of claim 16, wherein only the first process is authorized to modify the state information chunk.

* * * * *